United States Patent
Rudak et al.

(10) Patent No.: US 6,323,956 B1
(45) Date of Patent: Nov. 27, 2001

(54) ADAPTIVE QUANTIZATION OF GRAYSCALE IMAGES

(75) Inventors: Peter Rudak, Hilton; Andreas E. Savakis; Yongchun Lee, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 476 days.

(21) Appl. No.: 08/763,268

(22) Filed: Dec. 10, 1996

(51) Int. Cl.$^7$ ................................................. G06K 15/00
(52) U.S. Cl. ............................................ 358/1.2; 358/1.13
(58) Field of Search .......................... 395/102, 112, 395/114, 115, 116; 358/540, 426, 261.3, 447, 429, 430, 432, 433; 382/237, 251, 252, 284, 299

(56) References Cited

U.S. PATENT DOCUMENTS

| | | | |
|---|---|---|---|
| 4,682,869 | * 7/1987 | Itoh et al. | 358/260 |
| 5,070,413 | 12/1991 | Sullivan et al. | 358/456 |
| 5,384,646 | 1/1995 | Godshalk et al. | 358/448 |

OTHER PUBLICATIONS

P. R. Roetling, "Visual Performance and Image Coding", *SPIE/OSA vol. 74 (1976) Image Processing*, pp. 195–199.
R. S. Gentile et al., "Quantization and multilevel halftoning of color images for near–original image quality", vol. 7, No. 6/Jun. 1990/*Optical Society of America*, pp. 1019–1026.
R. Miller et al., "Mean–preserving multilevel halftoning algorithm", *SPIE vol. 1913*, 1993, pp. 367–377.
Y. S. Ng et al., "Gray Level Printing Method with Embedded Non–Uniformity Correction Using a Multi–Bit LED Printhead", *IS&T's 47th Annual Conference/ICPS*, 1994, pp. 622–625.

* cited by examiner

*Primary Examiner*—Arthur G. Evans
(74) *Attorney, Agent, or Firm*—Thomas H. Close

(57) ABSTRACT

A method of generating an M-bit grayscale image from an N-bit grayscale image, where 1<M<N, includes the steps of: for each pixel in the N-bit image, determining a threshold, based on the values of neighboring pixels, for generating the most significant bit (MSB) of the M-bit image, and determining thresholds, based on the threshold determined in step i) and the values of surrounding pixels, for each successive less significant bit(s) (LSB) of the M-bit image. The thresholds are used to quantize the pixels in the N-bit image to produce the M-bit image. The resulting M-bit image can be displayed on a multilevel display device for good readability, and the most significant bit of the M-bit image can be archived and printed on a binary printer thereby minimizing long term storage requirements.

8 Claims, 6 Drawing Sheets

ADAPTIVE QUANTIZATION OF GRAYSCALE IMAGES

APPENDIX

The disclosure in the appendix of this patent document contains material to which a claim of copyright protection is made. The copyright owner has no objection to the facsimile reproduction of any one of the patent documents or the patent disclosure as it appears in the U.S. Patent and Trademark Office patent file or records, but reserves all other rights whatsoever.

FIELD OF THE INVENTION

The present invention relates to the field of digital image processing and more particularly to processing of document images to reduce the amount of data used to represent the image.

BACKGROUND OF THE INVENTION

Document images which are scanned using 8 bits per pixel require large amounts of storage space and expensive hardware for processing. Scanned documents are currently quantized using one bit per pixel, which reduces the hardware and processing requirements, but degrades the image quality, specifically when these images are displayed on display devices which support 4–8 bits per pixel One known method of quantizing document images in a single-bit down is to use one-bit adaptive thresholding as disclosed in U.S. Pat. No. 5,583,659, entitled "A Multiwindowing Technique For Thresholding An Image Using Local Image Properties," issued Dec. 10, 1996, to Y. Lee, J. Basile, and P. Rudak. This approach limits the display to one bit. The current method of quantizing document images in a multi-bit domain employs fixed threshold points for each gray value. This approach results in poor image quality when a small number of bits per pixel is used to reduce data storage and processing requirements. There is a need therefore for an improved method of quantizing document images to optimize image quality when displayed on a multilevel display device while minimizing data storage requirements.

SUMMARY OF THE INVENTION

The present invention is directed to overcoming one or more of the problems set forth above. Briefly summarized, according to one aspect of the present invention, a method of generating an M-bit grayscale image from an N-bit grayscale image, where 1<M<N, includes the steps of: for each pixel in the N-bit image, determining a threshold, based on the values of neighboring pixels, for generating the most significant bit (MSB) of the M-bit image, and determining thresholds, based on the threshold determined in step i) and the values of surrounding pixels, for each successive less significant bit(s) (LSB) of the M-bit image. The thresholds are used to quantize the pixels in the N-bit image to produce the M-bit image. The resulting M-bit image can be displayed on a multilevel display device for good readability, and the most significant bit of the M-bit image can be archived and printed on a binary printer thereby minimizing long term storage requirements.

The proposed method quantizes the scanned images using two (or more) bits per pixel so that their display can be improved, while maintaining low requirements on storage and processing hardware. Additionally, the improvements in image quality can significantly improve character recognition accuracy especially for broken or partially formed characters.

ADVANTAGEOUS EFFECT OF THE INVENTION

Adaptive quantization of scanned images using two (or more) bits per pixel provides an image representation which is similar to the original image, while maintaining low storage and processing requirements. The invention provides:

Improved representation and display of scanned documents.

Low contrast text characters are better displayed.

Jaggedness around character contour is reduced.

Background is closer to original shade of gray.

Improved character recognition via OCR.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
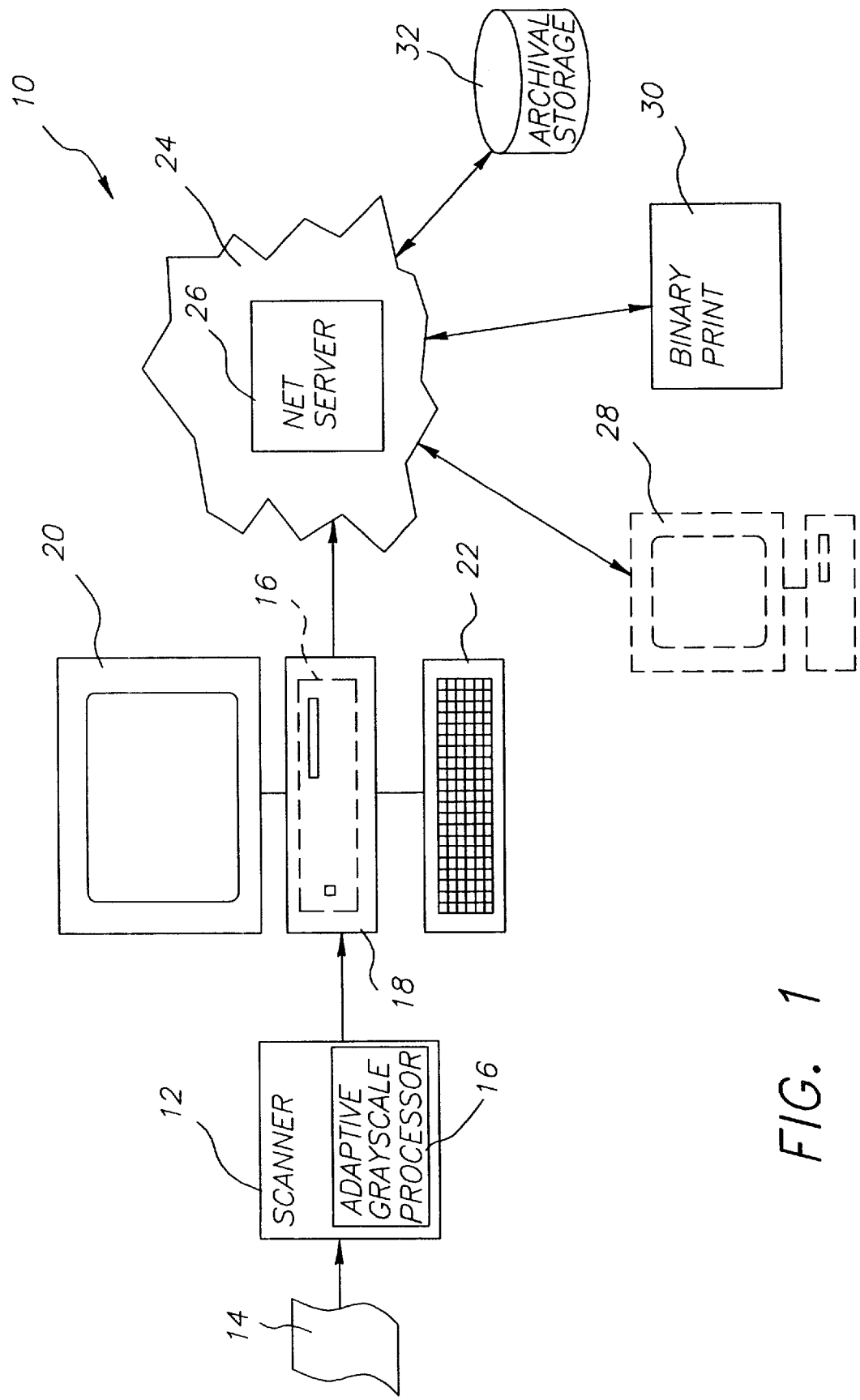
FIG. 1 is a schematic diagram of a document imaging system employing the method of the present invention.

The present invention is directed to a method of reducing the number of bits per pixel in a grayscale document image while enhancing the contrast of the characters and lines in the document Referring to FIG. 1, a document imaging system employing the method of the present invention is shown. The system, generally designated 10, includes a scanner 12 for scanning a document 14 to generate an N-bit (e.g. 8-bit) grayscale image. The scanner 12 includes an adaptive grayscale processor 16 for converting the N-bit grayscale image to an M-bit grayscale image (e.g. 2-bit), where M<N. For the purposes of the following discussion, an N=8-bit to an M=2-bit image conversion will be presumed. The scanner 12 is connected to a personal computer (PC) 18 that functions as a host to scanner 12. The PC 18 includes a display, such as a CRT 20 and an input device, such as keyboard 22. Alternatively, the adaptive grayscale processor 16 of the present invention may be located in the PC 18.

The PC 18 is connected to a network 24 that includes a net server 26. The network 24 provides access to a display monitor 28, a binary printer 30 such as a laser or inkjet printer, and an archival storage 32 such as a CD writer.

According to the present invention, the 2-bit image is used for display on the monitors 20 or 28, and the most significant bit of the 2-bit image is used for printing the image on the binary printer 30 and storing in archival storage 32. Alternatively, the 2-bit image may be stored in archival storage 32.

According to the present invention Quantization is performed adaptively based on whether or not the objective pixel is near an image edge. If the pixel is near an image edge, the quantization levels are determined based on the statistics of a local region surrounding the pixel. If the pixel is not near an image edge, the method employs fixed quantization levels. The quantized images display more information than images with one bit per pixel used by current approaches. The most significant bit (MSB) of the quantized (2-bit) image is equivalent to a binary image using adaptive thresholding. This image can be sent for printing, or can be used by current OCR software that require one bit per pixel. When the MSB and LSB binary images are combined, the resulting 2-bit per pixel representation enhances low contrast characters, reduces the jaggedness and breaks around character edges, and makes the background graylevel closer to the original. The method of the present invention allows the user to determine the level of adaptivity by adjusting a gradient threshold parameter GT. This parameter allows a system to be optimized for its intended application-viewing on a CRT, OCR, printing, etc.

Figure 2:
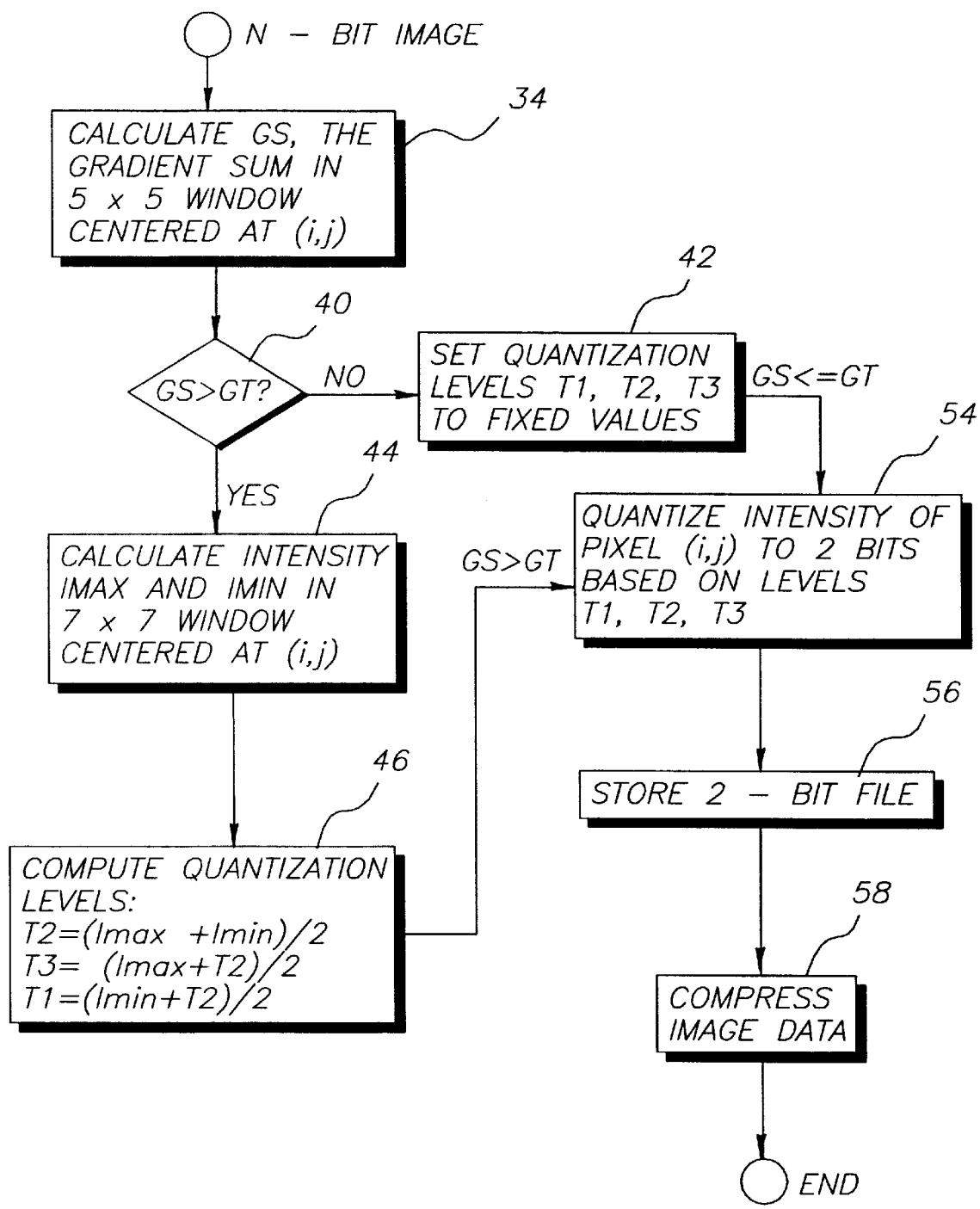
FIG. 2 is a flow chart illustrating the method of generating a quantized image from a grayscale image according to the present invention.

Referring to FIG. 2, the method of generating a quantized image from a grayscale image according to the present invention will now be described in detail. First, a gradient sum in a 5×5 window centered at pixel (i,j) is calculated (34) as follows.

Let F be the 8 bit grayscale image and H be the quantized image;

Let (i,j) be the coordinates of the pixel to be quantized;

Let $f(i,j)$ be the 8 bit graylevel value ($0<=f(i,j)<=255$) of the pixel to be quantized;

Let $h(i,j)$ be the M-bit value of the quantized pixel where M=2,3,4 . . . ;

Let Region A be a 5×5 rectangular region centered at (i,j);

Let $G(i,j)$ be the Sobel operator of image F at pixel (i,j) such that
$G(i,j)=|Gx(i,j)|+|Gy(i,j)|$, where
$Gx(i,j)=f(i+1,j-1)+2*f(i+1,j)+f(i+1,j+1)-f(i-1,j-1)-2*f(i-1,j)-f(i-1,j+1)$
$Gy(i,j)=f(i-1,j+1)+2*f(i,j+1)+f(i+1,j+1)-f(i-1, j-1)-2*f(i,j-1)-f(i+1, j-1);$ Let $Gsum(i,j)=Sum\{G(p,q),$ where $(p,q)$ are pixels in Region A$\}$; and Let GT be a user supplied value for comparison with Gsum.

Figure 3:
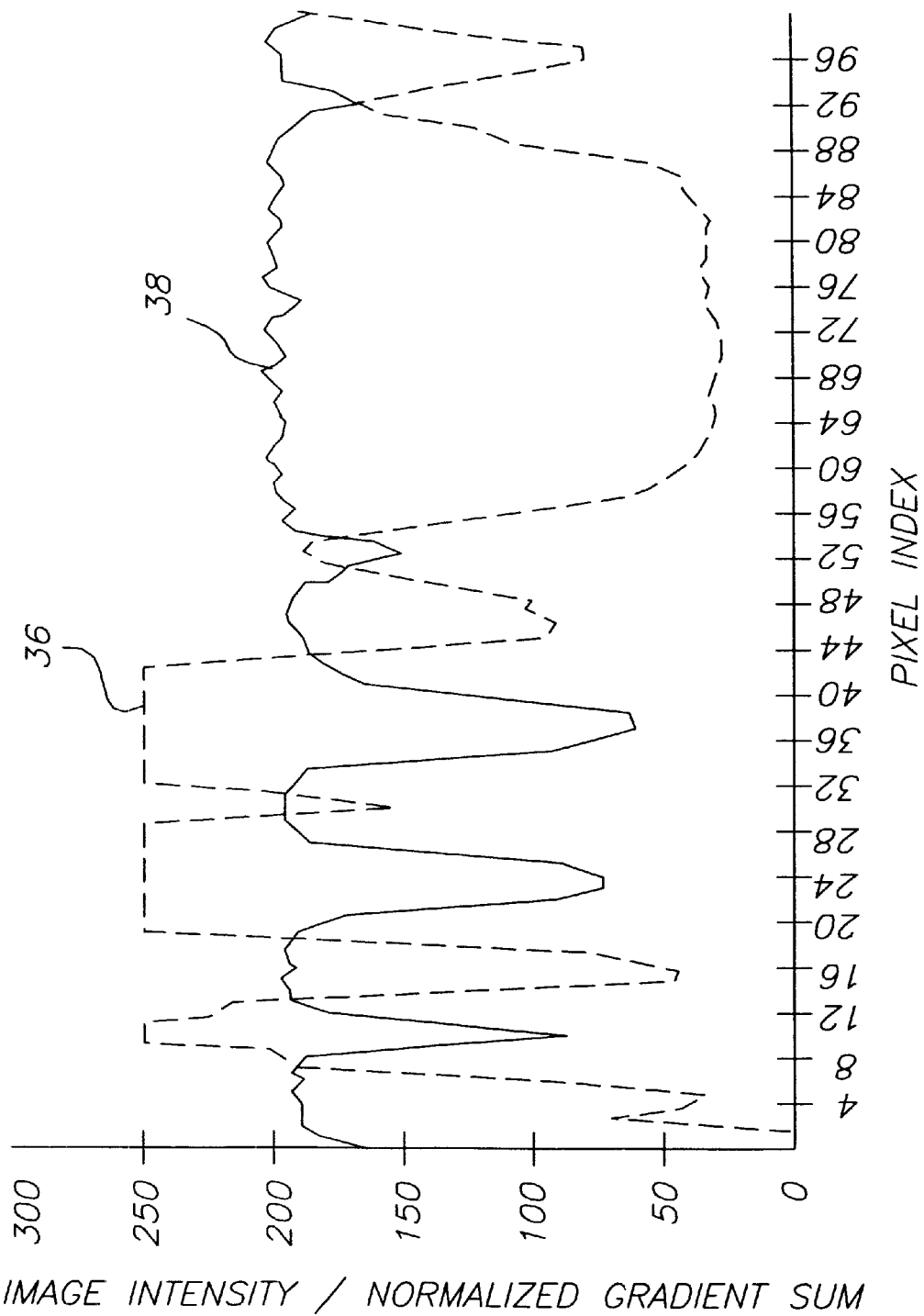
FIG. 3 is a graph useful in describing the method of the present invention, showing one line of a grayscale image and the gradient sum based on a local window.

FIG. 3 shows the gradient sum 36 plotted with the intensity level 38 for one line of a document image.

Returning to FIG. 2, next, a test is made (40) to determine whether the image pixel currently being processed is near an edge in the image. The test (40) is performed as follows:

If Gsum<GT, then use fixed quantization levels T1, T2, and T3 (42)

If Gsum>=GT, then calculate intensity maxima and minima (44) in a 7×7 window centered on pixel (i,j) as follows:

Let Region B be a 7×7 rectangular region centered at (i,j);

Let Imax=max$\{f(p,q),$ where $(p,q)$ is in Region B$\}$;

Let Imin=min$\{$ f(p,q), where (p,q) is in Region B$\}$; and compute quantization levels uniformly distributed between Imax and Imin (46) as follows:

$T1=(Imax+3*Imin)/4, T2=(Imax+Imin)/2, T3=(3*Imax+Imin)/4.$

Figure 4:
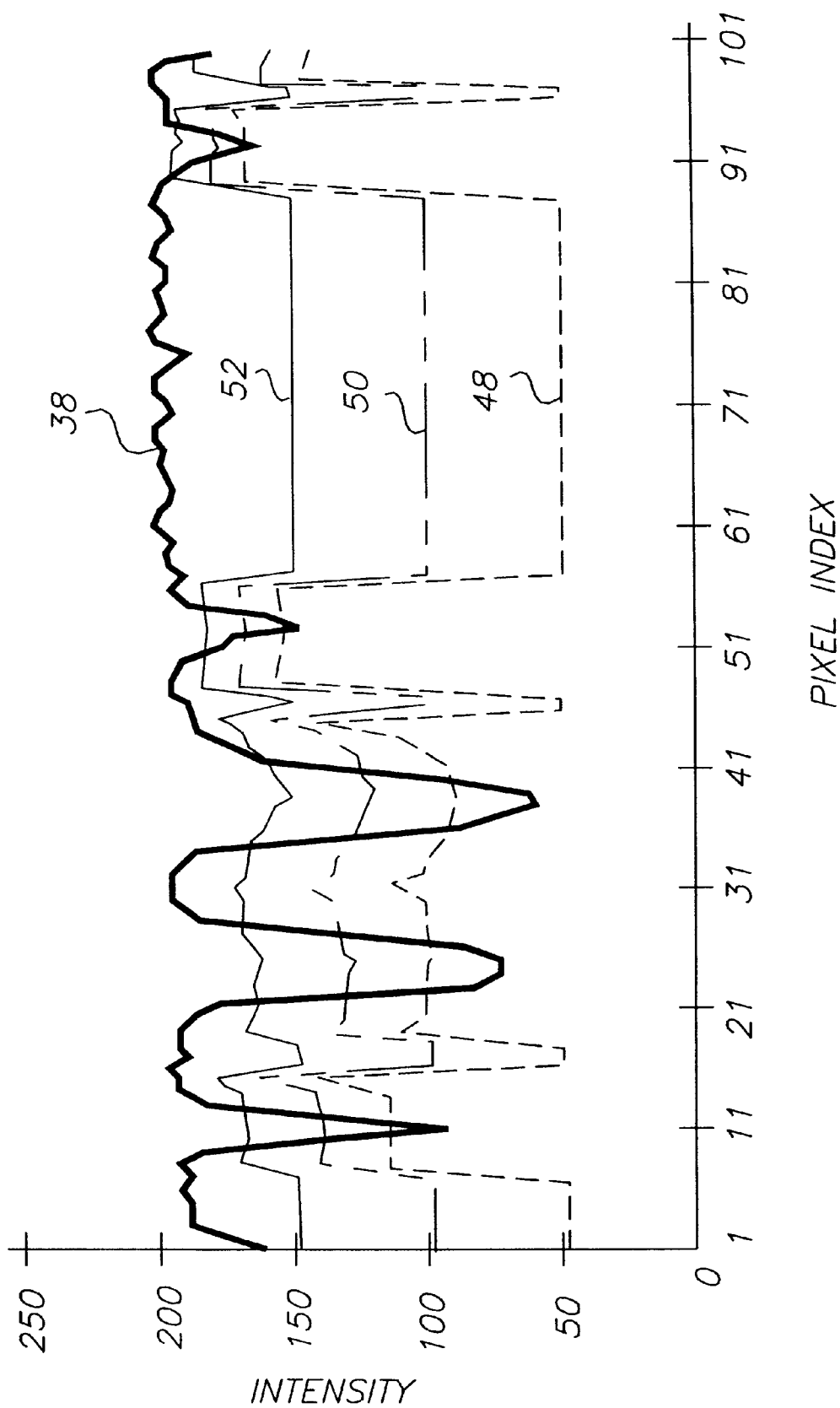
FIG. 4 is a graph useful in describing the method of the present invention, showing one line of a grayscale image and the corresponding quantization levels.

The quantization levels T1, T2, and T3, shown by lines 48, 50 and 52 respectively, computed for the one line 38 of grayscale image are shown in FIG. 4, and where the fixed quantization levels have been set to T1=50, T2=100, and T3=150.

Quantization (54) of the gray level image pixel is done as follows:

If $f(i,j)<T1$, $h(i,j)=00$;

If $T1<=f(i,j)<T2$, $h(i,j)=01$;

If $T2<=f(i,j)<T3$, $h(i,j)=10$;

and

If $f(i,j)>=T3$, $h(i,j)=11$, where 00, 01, 10, and 11 represent binary values.

Figure 5:
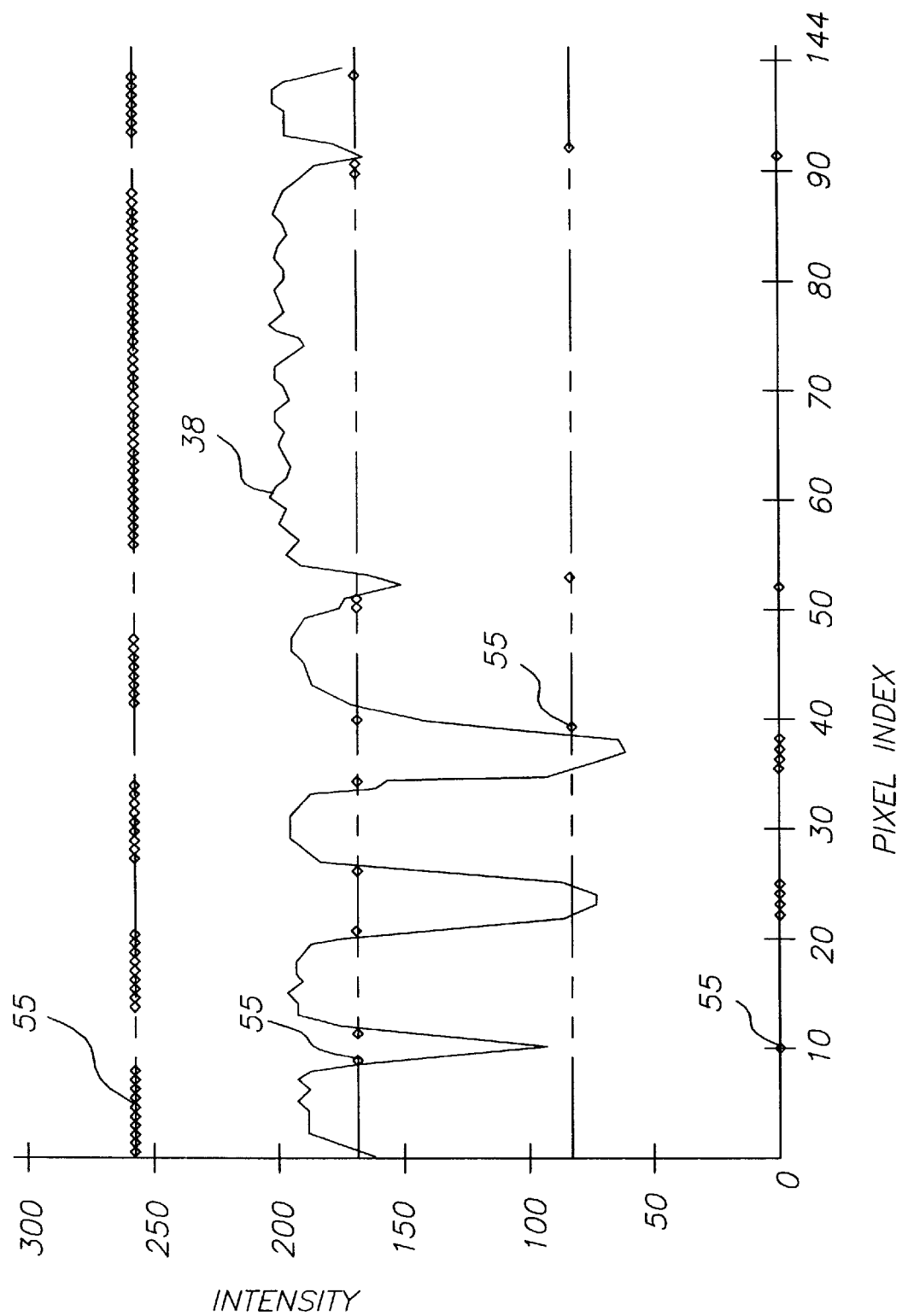
FIG. 5 is a graph useful in describing the method of the present invention, showing one line of a grayscale image and the resulting 2-bit quantization.

The results of the quantization step (54) for the one line 38 of a grayscale image are shown in FIG. 5, where the four level binary results are shown by diamonds 55.

Figure 6:
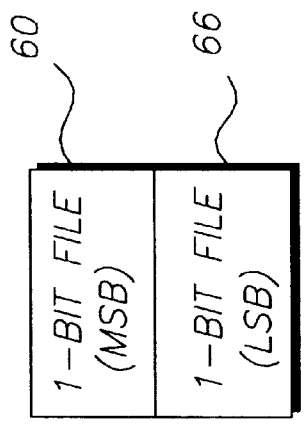
FIG. 6 is a schematic diagram illustrating a preferred file structure of a document image resulting from 2-bit version of the present invention.

Finally the 2-bit binary image is stored (56) and optionally compressed (58) using a lossless compression technique such as group 3, group 4 or JBIG compression. Referring to FIG. 6, the compressed 2-bit image is preferably stored as two 1-bit image files 60 and 62 representing the most significant bit (MSB) and least significant bit (LSB) of the image respectively. In this format, the most significant bit may be recalled and displayed on a binary output device independently of the least significant bit.

Figure 7:
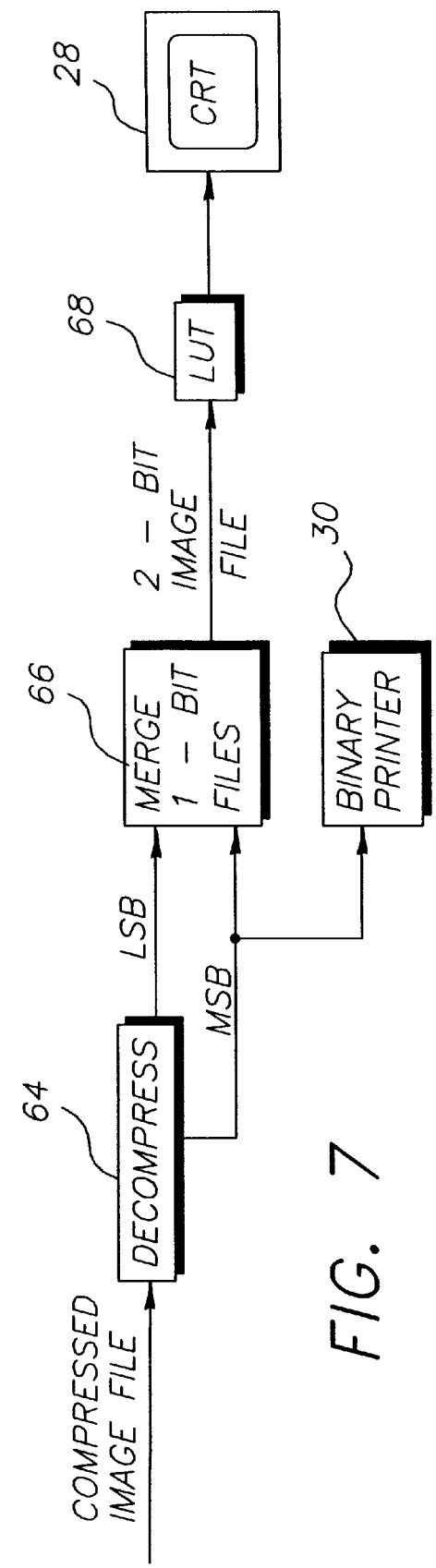
FIG. 7 is a schematic diagram illustrating the decompression and display of the quantized image according to the present invention.

Referring to FIG. 7, when the image is to be displayed, the compressed image file is decompressed (64). For display on a multilevel display device, such a CRT, the two one-bit files are merged (66) and supplied to a look-up table 68 associated with the multilevel display 28. The look-up table 68 converts the two-bit image values to values appropriate for display on the particular display device 28, as is well known in the art. For printing on the binary printer 30, only the most significant bit of the image is sent to the printer 30.

A computer program written in the C programming language for performing an 8-bit to 2-bit quantization according to the present invention is included in Appendix A.

The invention has been described with reference to a preferred embodiment. However, it will be appreciated that variations and modifications can be effected by a person of ordinary skill in the art without departing from the scope of the invention. For example, although the invention has been disclosed and described with reference to a quantization from 8 bits to 2 bits, it will be apparent to one of ordinary skill in the art that the method of the present invention may be employed to quantize an image from N bits to M bits where M<N.

APPENDIX A

/ Fast 2 bit Adaptive Threshold : Code by Andreas Savakis /

/* This program reads image lines and extracts 7×7 block for processing */ include <stdio.h>
include <rasterfile.h>
include <math.h>

```
#define TRUE 1
define FALSE 0 typedef unsigned char Byte;

int width,height;

Byte *Irow; /* Current line */
Byte *Irow_p1; /* Current line plus 1*/
Byte *Irow_p2; /* Current line plus 2*/
Byte *Irow_p3; /* Current line plus 3 */
Byte *Irow_m1; /* Current line minus 1*/
Byte *Irow_m2; /* Current line minus 2 */
Byte *Irow_m3; /* Current line minus 3 */
Byte *Iout; /* Current line of tholded image */ typedef struct rasterfile Header;

********************************************* main ( )
   char iname[20], oname[20];
   int i,j, k, p,q,
      f[7][7], /* image block for processing */
      thold_lo, thold_mid, thold_hi, /* thold values used
         for quantization */
      fixed_lo, fixed_mid, fixed_hi, /* fixed thold values */
      level, /* value to be compared with the gradient sum */
      grad, /* gradient of individual pixels */
      grad_x, grad_y,
      Imax, Imin, 7* max and min of 7×7 image block */
      Gsum; /* sum of gradient in 5×5 block */

FILE *infile,*outfile;

/* File info */ printf("Image name: ");
scanf("%s",iname);
printf("Binary image name: ");
scanf("%s",oname);
printf("Enter Lo Fixed Thold (0<T<256): ");
scanf("%d",&fixed_lo);
printf("Enter Mid Fixed Thold (0<T<256): ");
scanf("%d",&fixed_mid);
printf("Enter Hi Fixed Thold (0<T<256): ");
scanf("%d",&fixed_hi);
printf("Level of Gradient Adaptivity (0<level<100): ");
scanf("%d",&level);
level *=10;

infile = fopen(iname,"r");
outfile = fopen(oname,"wb");

ReadHeader(infile);
WriteHeader(outfile);

/* Allocate memory */

Irow = (Byte *) malloc(width,(int) sizeof(Byte));
   Irow p1 = (Byte *) malloc(width,(int) sizeof(Byte));
   Irow_p2 = (Byte *) malloc(width,(int) sizeof(Byte));
   Irow_p3 = (Byte *) malloc(width,(int) sizeof(Byte));
   Irow_m1 = (Byte *) malloc(width,(int) sizeof(Byte));
   Irow_m2 = (Byte *) malloc(width,(int) sizeof(Byte));
   Irow_m3 = (Byte *) malloc(width,(int) sizeof(Byte));
   Iout = (Byte *) malloc(width,(int) sizeof(Byte));

/* Initialize */ fread(Irow_p1,1,width,infile);
   fread(Irow_p2,1,width,infile);
   fread(Irow_p3,1,width,infile);
   for(j=0; j<width; j++) {
      Irow[j] = Irow_p1 [j];
      Irow_m3[j] = Irow[j];
      Irow_m2[j] = Irow[j];
      Irow_m1[j]= Irow[j];
   }

/**** LOOP: (i,j) coords determine the center of the 7×7
block ****/ for(i=0; i<height; i++) {

/* Move to new 7×7 block by shifting 6 lines and reading 1
line */ for(j=0; j<width; j++){
   Irow_m3[j] = Irow_m2[j];
   Irow_m2[j] = Irow_m1[j];
   Irow_m1[j] = Irow[j];
   Irow[j] = Irow_p_[j];
   Irow_p1[j] = Irow_p2[j];
   Irow_p2[j] = Irow_p3[j];
} fread(Irow_p3,1,width,infile);

/** Top and Bot Edge Processing **/
if(i<3 ||i>=height-3) {
   /* Convert image to binary using fixed tholds */
      thold_lo=fixed_lo;
      thold_mid=fixed_mid;
      thold_hi=fixed_hi;
   for (j=0; j<width; j++) {
      if(Irow[j]<thold_lo) Iout[j]=0;
      if(Irow[j]>=thold_lo && Irowf[j]<thold_mid) Iout
         [j]=85;
      if(Irow[j]>=thold_mid && Irow[j]<thold_hi) Iout[j]=
         170;
      if(Irow[j]>=thold_hi) Iout[j]=255;
   }/* end for */
}/* end if */
/***** Vertical main body processing ******/
else { for (j=0; j<width; j++) {

/* Left and Right Edge processing */
if(j<3 ||j>=width-3) {
   /* Convert image to binary using fixed thold*/
      thold_lo=fixed_lo;
      thold_mid=fixed mid;
      thold_hi=fixed_hi;
   if(Irow[j]<thold_lo) Iout[j]=0;
   if(Irow[j]>=thold_lo && Irow[j]<thold_mid) Iout[j]=
      85;
```

```
    if(Irow[j]>=thold_mid && Irow[j]<thold_hi) Iout[j]=
       170;
    if(Irow[j]>=thold_hi) Iout[j]=255;
    }/* end if */
else {
/*** Horizontal main body processing ***/

/* Extract 7×7 block from row buffers into f[][]*/ for(k=0; k<7; k++) {
    f[0][k] = Irow_m3[j+k-31];
    f[1][k] = Irow_m2[j+k-3];
    f[2][k] = Irow_m1[j+k-3];
    f[3][k] = Irow[j+k-3];
    f[4][k] = Irow_p1[j+k-3];
    f[5][k] = Irow_p2[j+k-3];
    f[6][k] = Irow_p3[j+k-3];
/* end for k */

/* Compute sum of gradients over a 5×5 block at the center
of the 7×7 block */
Gsum=0;
for(p=1; p<=5; p++) {/* (p,q) is the point in f[][] block
whose gradient is being computed
for(q=1; q<=5; q++) {
    grad = grad_x = grad_y = 0;
grad_x= f[p-1][q+1]+2*f[p][q+1]+f[p+1][q+1]-f[p-1][q-
1]-2*f[p][q-1]-f[p+1][q-1]; grad_y= f[p+1][q-1]+2*f
[p+1][q]+f[p+1][q+1]-f [p-1][q-1 ]-2*f[p-1][q]-f [p-1]
[q+1];
    grad = abs(grad_x) + aba(grad_y);
GSum+=grad;
}} /* end for p, q */

/* Normalize sum of gradients */

Gsum/=4;
    if(Gsum>1000)Gsum=1000;
/* Determine threshold */

/* Fixed threshold */
if(Gsum<level) {
    thold_lo=fixed_lo;
    thold_mid=fixed_mid;
    thold_hi=fixed_hi;
    } /* end if Gsum */

/* Adaptive threshold */
else {

Imax=Imin=f[0 ] [0];
for(p=0; p<7; p++) {
for(q=0; q<7; q++) {
    if(f[p][q]>Imax) Imax=f[p][q];
    if(f[p][q]<Imin) Imin=f[p][q];
}} /* end for p, q */ thold_lo = (3*Imin+Imax)/4;
    thold_mid = (Imax+Imin)/2;
    thold_hi = (3*Imax+Imin)/4;

} /* end else */

/* Convert image to binary */
    if(Irow[j]<thold_lo) Iout[j]=0;
    if(Irow[j]>=thold_lo && Irow[j]<thold_mid) Iout[j]=
       85;
    if(Irow[j]>=thold_mid && Irow[j]<thold_hi) Iout[j]=
       170;
    if(Irow[j]>=thold_hi) Iout [j]=255;

} /* end horizontal main body processing else */

} /* end for j */

/* end vertical main body processing else */ fwrite(Iout,1,width,outfile);
    } /* end for i */ fclose(infile);
    fclose(outfile);

} /* End main */
```

/************************************************

PARTS LIST 10 document imaging system
12 scanner
14 document
16 adaptive grayscale processor
18 personal computer
20 CRT
22 keyboard
24 network
26 net server
28 display monitor
30 printer
32 archival storage
34 calculate gradient sum step
36 gradient sum
38 one line of image intensity
40 comparing gradient sum to gradient threshold step
42 set quantization levels to fixed level step
44 calculating density maxima and minima step
46 compute quantization levels step
48 T1 quantization level
50 T2 quantization level
52 T3 quantization level
54 quantization step
55 quantized levels for one line of image
56 store 2-bit image file step
58 compress 2-bit image file step
60 MSB file
62 LSB file
64 decompress step
66 merge file step
68 look-up table

What is claimed is:

1. A method of generating an M-bit grayscale image from an N-bit grayscale image, where 1<M<N, comprising the steps of:

a) for each pixel in the N-bit image, i) determining a threshold, based on the values of neighboring pixels, for generating the most significant bit (MSB) of the M-bit image, ii) determining thresholds, based on the threshold determined in step i) and the values of surrounding pixels, for each successive less significant bit(s) (LSB) of the M-bit image; and b) applying the thresholds to quantize the pixels in the N-bit image to produce the M-bit image.

2. The method claimed in claim 1, wherein M=2, and further comprising the step of storing the most significant bits of the 2-bit image in a first file and the least significant bits of the 2-bit image in a second file.

3. The method claimed in claim 2, further comprising the steps of:

a) merging the first and second files and displaying the merged files on a multilevel display device; and b) printing the first file on a binary printer.

4. The method of claim 2, further comprising the step of compressing the first and second files and storing the compressed files.

5. The method of claim 4, further comprising the steps of:

a) decompressing the compressed files;

b) merging the first and second decompressed files and displaying the merged files on a multilevel display device; and c) printing the first decompressed file on a binary printer.

6. The method of claim 1, wherein M=2 and the step of determining the thresholds for generating the MSB and LSB, comprises the steps of:

a) calculating the sum of the gradients of pixels in a first neighborhood;

b) comparing the sum of the gradients to a predetermined gradient threshold: and i) if the gradient sum is less than or equal to the gradient threshold, setting the MSB and LSB thresholds to predetermined values;

ii) if the gradient sum is greater than the gradient threshold, determining the maximum and minimum pixel values in a second neighborhood and employing the determined maximum and minimum pixel values to calculate the MSB and LSB thresholds.

7. The method claimed in claim 6, wherein the MSB threshold is the average value of the determined maximum and minimum pixel values; an upper LSB threshold is the average value of the maximum pixel value and the MSB threshold; and a lower LSB threshold is the average value of the minimum pixel value and the MSB threshold.

8. The method claimed in claim 6, wherein the gradient of a pixel is determined as a weighted sum of the differences between a pixel and its surrounding pixels, and the first neighborhood is a 5×5 window of pixels and the second neighborhood is a 7×7 window of pixels.

* * * * *